United States Patent [19]

Nicopolis

[11] Patent Number: 5,466,028
[45] Date of Patent: Nov. 14, 1995

[54] STORAGE COMPARTMENT FOR AN AUTOMOTIVE VEHICLE

[75] Inventor: Michael D. Nicopolis, West Bloomfield, Mich.

[73] Assignee: Ford Motor Company, Dearborn, Mich.

[21] Appl. No.: 172,783

[22] Filed: Dec. 27, 1993

[51] Int. Cl.⁶ ........................................... B60R 7/04
[52] U.S. Cl. .................. 296/37.7; 224/311; 224/315; 296/37.16
[58] Field of Search ................ 296/37.7, 37.8, 296/37.16; 224/311

[56] References Cited

U.S. PATENT DOCUMENTS

| | | | |
|---|---|---|---|
| 2,075,096 | 3/1937 | Crommey | 296/37.7 |
| 2,219,076 | 10/1940 | Marzilli | 296/37.7 |
| 2,639,068 | 5/1953 | Luby et al. | 224/311 |
| 3,534,892 | 10/1970 | Truelove, Sr. | 224/311 |
| 4,101,159 | 7/1978 | Stewart | 296/37.7 |
| 4,368,937 | 1/1983 | Palombo et al. | 296/37.7 X |
| 4,469,365 | 9/1984 | Marcus et al. | 296/37.7 |
| 5,062,559 | 11/1991 | Falcoff | 296/37.8 |
| 5,310,234 | 5/1994 | Klein | 296/37.7 |

FOREIGN PATENT DOCUMENTS

| | | | |
|---|---|---|---|
| 0219440 | 9/1988 | Japan | 296/37.7 |
| 3136940 | 11/1991 | Japan. | |
| 2121365 | 12/1983 | United Kingdom | 224/311 |

*Primary Examiner*—David M. Mitchell
*Assistant Examiner*—Kia M. Robinson
*Attorney, Agent, or Firm*—Kevin G. Mierzwa; Roger L. May

[57] ABSTRACT

An auxiliary storage compartment for an automobile has a compartment body with a pair of side portions and a substantially horizontal floor portion forming a U-shaped opening. The compartment body is rigidly attached to the roof and extends laterally across the width of the vehicle above the cargo storage area. The side portions, floor portion and the vehicle roof define a compartment therebetween. A bezel member, having at least one opening therein, is connected to compartment body and enclosing the U-shaped opening between the roof and the compartment body. At least one door is movably attached to the bezel opening for enclosing and providing access to the compartment. A latching mechanism on the door secures the door in a closed position.

20 Claims, 2 Drawing Sheets

STORAGE COMPARTMENT FOR AN AUTOMOTIVE VEHICLE

BACKGROUND OF THE INVENTION

The invention relates generally to a storage compartment for an automotive vehicle and more specifically to an auxiliary storage compartment mounted over a rearward cargo area.

In an automotive vehicle, especially in a sport/utility vehicle, a need exists to maximize the storage space without intruding on the passenger space. One solution is to mount a console between the front seats as disclosed in U.S. Pat. No. 5,062,559.

In a sport/utility type vehicle generally there are two rows of seating. Behind the second row of seating is a cargo storage area. An unutilized space exists between the roof and the driver's rearward sight line.

It would be desirable to provide a storage compartment in the unutilized portion of an automotive vehicle over the rearward cargo storage area without reducing the passenger space.

SUMMARY OF THE INVENTION

An advantage of the present invention is that a storage compartment is provided in the previously unutilized space above the cargo storage area without interfering with the driver's rearward sight line.

A preferred embodiment of the present invention includes a compartment body with a pair of side portions and a substantially horizontal floor portion forming a U-shaped opening. The compartment body is rigidly attached to the roof and extends laterally across the width of the vehicle above the cargo storage area. The side portions, floor portion and the vehicle roof define a compartment therebetween. A bezel member, having at least one opening therein, is connected to compartment body and enclosing the U-shaped opening between the roof and the compartment body. At least one door is movably attached to the bezel opening for enclosing and providing access to the compartment. A latching mechanism on the door secures the door in a closed position.

DETAILED DESCRIPTION OF THE PREFERRED EMBODIMENT

Figure 1:
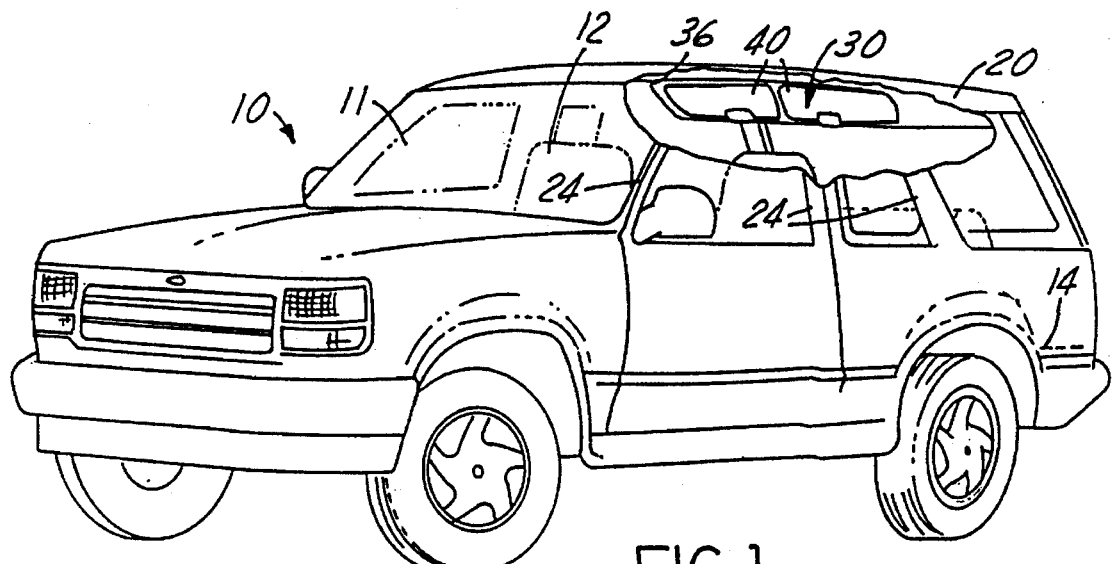
FIG. 1 is a perspective view of an automotive vehicle having a compartment according to the preferred embodiment of the invention.

Referring now to FIG. 1, an automotive vehicle 0, such as a sport/utility vehicle or station wagon, is illustrated as including a passenger compartment 11 with two rows of longitudinally spaced seats 12. Rearwardly spaced from seats 12 is a cargo storage area 14. A compartment 30 extends over cargo storage area 14.

Figure 2:
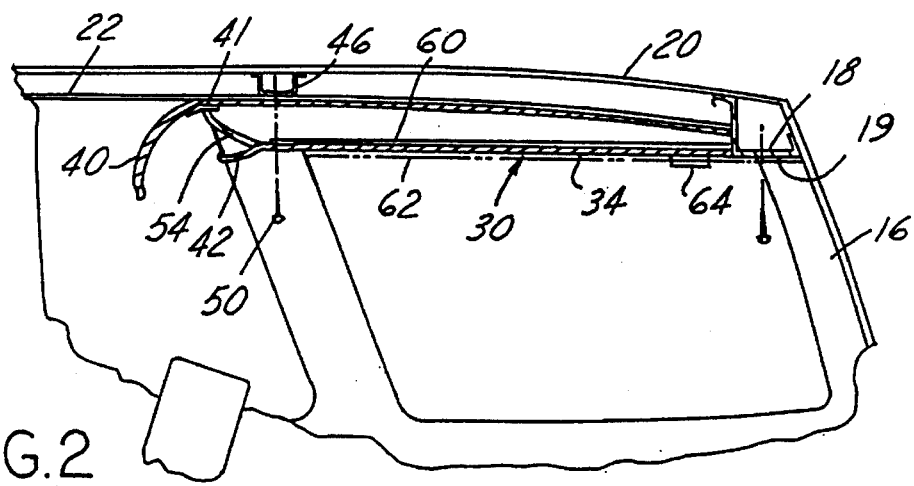
FIG. 2 is a longitudinal cross sectional view of the preferred embodiment.

Referring now to FIGS. 1 and 2, pillars 24 which are generally located at the corners of passenger compartment 11 and at least one additional pillar 24 on either side of vehicle 10. Pillars 24 are used to support structural members such as the header 18 which extends across the rear of vehicle 10 and is used to support roof 20. Roof 20 slopes down slightly as it extends back to header 18. Header 18 extends down slightly below roof 20. A headliner 22 lines the interior of roof 20.

Figure 3:
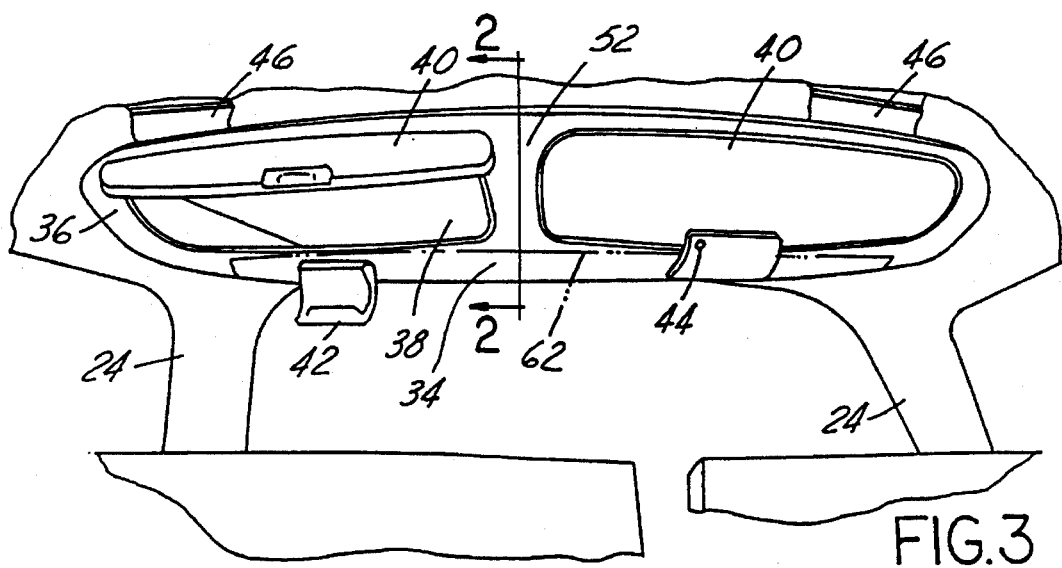
FIG. 3 is a front view of the preferred embodiment.

Referring now to FIGS. 2 and 3, access to cargo storage area 14 is provided from the outside of vehicle 10 through external cargo door 16. Header 18 extends above door 16 and has a lower surface 19 defining the lowest rearward sight line. The space between the driver's sight line and headliner 22 on roof 20 is unutilized in such vehicles. To increase the usable storage space for vehicle 10, a compartment 30 is formed above cargo storage area 14 and the driver's sight line.

Compartment 30 is defined by two longitudinal side walls 32 and a floor member 34. Side walls 32 are tapered to the slope of roof 20 in order to position floor member 34 in a generally horizontal plane with header 18. Longitudinal side walls 32 are connected to the sides of floor member 34 forming a substantially U-shaped opening in the forwardmost portion of compartment 30. The rearmost portion of compartment 30 uses header 18 for enclosure. It is preferred that floor member 34 and longitudinal walls are integrally formed, however, they may be formed as separate components. One method of integrally forming compartment 30 is to blow mold it from polyethylene.

A bezel 36 is used to enclose the front U-shaped opening of compartment 30. Bezel 36 has at least one opening 38. However, bezel 36 is preferably provided with two openings 38 separated by a vertical support portion 52. Vertical support portion 52 provides rigidity to floor member 34. It is preferred that opening 38 in bezel 36 not extend to floor member 34 so as to form a ledge 54 with floor member 34 to prevent objects stored within said compartment 30 from rolling out when the opening 38 is unobstructed.

A door 40 is used to enclose each opening 38. Door 40 has a biasing mechanism such as a spring 41 to bias door 40 in an open position to facilitate entry to compartment 30. A known latch 42 is used to secure door 40 in a closed position. To provide lockable storage, latch 42 can also incorporate a known lock mechanism 44 similar to that found on a glovebox.

Compartment 30 is secured to vehicle 10 by providing a bracket 46 which is secured to roof 20 preferably by welding. Side walls 32 preferably include integrally formed flanges 48 with a hole 49 through which a fastener 50 such as a screw, bolt or rivet is placed to hold compartment 30 to brackets 46. Two laterally spaced brackets 46 are provided toward the forwardmost portion of compartment 30 whereby each wall 32 can be attached to a bracket 46. A bracket 46 may be provided for the rearmost portion of compartment. However, the rearmost portion is preferably secured directly to header 18 as by insertion of fasteners through holes 51.

Figure 4:
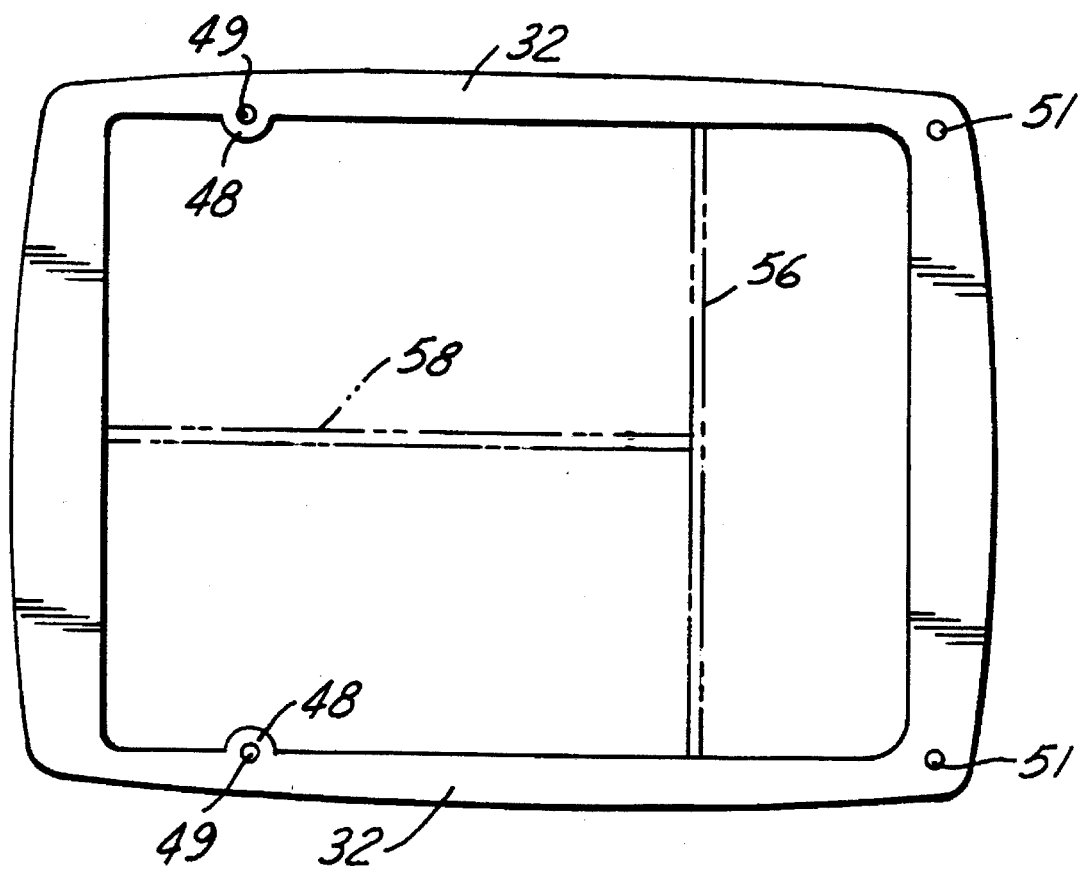
FIG. 4 is a top view of the preferred embodiment showing additional partitioning of the compartment.

Referring now to FIG. 4, the interior of compartment 30 may be partitioned in several ways. A lateral wall 56 formed between the floor member 34 and headliner 22 preventing the interior compartment space from being so deep that the contents in the rearmost portion of compartment 30 are unreachable. A longitudinal wall 58 prevents excessive side to side movement of contents contained in compartment 30. Both walls 56 and 58 may be integrally formed with floor member 34 or assembled as separate pieces. Also within compartment 30 a foam rubber or other cushioning-type material may be used to line floor member 34 preventing items carried in compartment 30 from rattling.

The underside of compartment 30 may be provided with a trim insert 62 made of similar material as headliner 22 for further aesthetic appeal as shown in FIGS. 2 and 3.

The present invention is intended to include modifications and variations that would be obvious to those skilled in the art. For example, the underside of compartment 30 may include a light 64 to illuminate cargo storage 14 below. Further, various configurations of the internal structure can be provided for different applications such as including a compact disc changer in the compartment or other built-in equipment.

What is claimed is:

1. An auxiliary storage compartment for an automotive vehicle having two longitudinally spaced seating positions, a cargo storage area spaced longitudinally rearwardly of said seating positions and a transversely mounted header member across the most rearward portion of the cargo storage area and having a lowermost surface, said compartment comprising:

a compartment body having a pair of side portions and a substantially horizontal floor portion forming a U-shaped opening, said compartment body rigidly attached to the roof and substantially extending across the width of the vehicle above the cargo storage area, said side portions, floor portion, the vehicle roof, and transversely mounted header member defining a compartment therebetween, said floor portion having a lower surface substantially coplanar with said lowermost surface of said transversely mounted header member said floor portion extending horizontally from and fixedly attached to the transversely mounted header member;

a bezel member connected to said compartment body and enclosing said U-shaped opening between the roof and said compartment body and having at least one opening therein;

at least one door movably attached to said bezel in said opening for enclosing and providing access to said compartment; and latching mechanism on said door for securing said door in a closed position.

2. An auxiliary storage compartment as recited in claim 1 wherein said roof further comprises a headliner, said compartment body connected to said roof so that the headliner is between the roof and said compartment body.

3. An auxiliary storage compartment as recited in claim 1 wherein said latching mechanism includes a key activated lock.

4. An auxiliary storage compartment as recited in claim 1 wherein said side portions and said floor portions for a unitary structure.

5. An auxiliary storage compartment as recited in claim 1 wherein said cargo storage area further comprises a transversely mounted header member extending thereacross, said compartment body also being connected to said header member.

6. An auxiliary storage compartment as recited in claim 1 further comprising a foam rubber material layer on the upper surface of said floor portion inside said compartment.

7. An auxiliary storage compartment as recited in claim 1 wherein said bezel further comprises two openings, said openings spaced apart by a vertical support portion integral with said bezel.

8. An auxiliary storage compartment as recited in claim 1 wherein said bezel opening defines a ledge with said floor portion.

9. An auxiliary storage compartment as recited in claim 1 wherein said compartment further comprises a vertical wall member extending transversely across said compartment between the roof and said floor portion.

10. An auxiliary storage compartment as recited in claim 1 wherein said compartment further comprises a vertical wall portion extending longitudinally through said compartment between the roof and said floor portion.

11. An auxiliary storage compartment as recited in claim 1 further comprising a fabric insert on the underside of said floor portion.

12. An auxiliary storage compartment as recited in claim 1 wherein said door further comprises biasing means for urging the doors toward an open position.

13. An auxiliary storage compartment for an automotive vehicle having two longitudinally spaced seating positions, a cargo storage area spaced longitudinally rearwardly of said seating positions and a transversely mounted header member across the most rearward portion of the cargo storage area, said compartment comprising:

a compartment body having a pair of tapered side portions of decreasing heights and a floor portion forming a U-shaped opening, said side portions of said compartment body rigidly attached to the vehicle roof and said floor portion having a lower surface substantially coplanar with the lowermost surface of said transversely mounted header member extending horizontally from and rigidly attached to the transversely mounted header member so that said compartment body substantially extends laterally across said vehicle above the cargo storage area, said side portions, said floor portion, the transversely mounted header member and the vehicle roof defining a compartment having an opening therebetween.

14. An auxiliary storage compartment as recited in claim 13 further comprising a bezel member connected to said compartment body and enclosing said U-shaped opening.

15. An auxiliary storage compartment as recited in claim 13 further comprising at least one door movably attached to said bezel in said opening for enclosing and providing access to said compartment.

16. An auxiliary storage compartment as recited in claim 15 wherein said door is attached by a spring for biasing said door in an open position.

17. An auxiliary storage compartment as recited in claim 15 further comprising latching means on said door for securing said door in a closed position.

18. An auxiliary storage compartment as recited in claim 13 said roof further comprising a headliner, said compartment body connected to said roof so that the headliner is between the roof and said compartment body.

19. An auxiliary storage compartment as recited in claim 14 wherein said bezel further comprises two openings, said openings spaced apart by a vertical support portion integral with said bezel.

20. An auxiliary storage compartment as recited in claim 13 further comprising a rubberized mat on the inside surface of said floor portion of said compartment.

\* \* \* \* \*